US012683650B2

(12) United States Patent
Gandhi et al.

(10) Patent No.: US 12,683,650 B2
(45) Date of Patent: Jul. 14, 2026

(54) WIRELESS COMMUNICATION WITH AMBIENT POWER DEVICES USING RECONFIGURABLE INTELLIGENT SURFACES

(71) Applicant: Cisco Technology, Inc., San Jose, CA (US)

(72) Inventors: Indermeet S. Gandhi, San Jose, CA (US); Robert E. Barton, Richmond (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 570 days.

(21) Appl. No.: 18/194,342

(22) Filed: Mar. 31, 2023

(65) Prior Publication Data

US 2024/0333338 A1      Oct. 3, 2024

(51) Int. Cl.
    *H04B 7/0426* (2017.01)
    *H04B 7/04* (2017.01)
(52) U.S. Cl.
    CPC ....... *H04B 7/04013* (2023.05); *H04B 7/0426* (2013.01)
(58) Field of Classification Search
    CPC ... H04B 7/04013; H04B 7/0426; H02J 50/20; H04W 52/42; H04W 16/28; H04W 52/0235
    See application file for complete search history.

(56) References Cited

U.S. PATENT DOCUMENTS

| | | | | |
|---|---|---|---|---|
| 2022/0131727 A1* | 4/2022 | Khoryaev | .............. | H04L 27/261 |
| 2022/0132527 A1* | 4/2022 | Cui | ...................... | H04W 56/001 |
| 2023/0224880 A1* | 7/2023 | Xiong | ............... | H04W 72/0446 |
| | | | | 370/329 |
| 2024/0048214 A1* | 2/2024 | Kwon | ................... | H04B 7/0695 |
| 2024/0094325 A1* | 3/2024 | Duan | ......................... | G01S 5/10 |
| 2024/0137134 A1* | 4/2024 | Sahraei | .................. | H04B 17/12 |

(Continued)

FOREIGN PATENT DOCUMENTS

| | | |
|---|---|---|
| CN | 111698046 A | 9/2020 |
| CN | 112260740 A | 1/2021 |

(Continued)

OTHER PUBLICATIONS

S. Zargari et al., "Energy-Efficient Hybrid Offloading for Backscatter-Assisted Wirelessly Powered MEC with Reconfigurable Intelligent Surfaces," arXiv.org, Dated: Jun. 1, 2022, pp. 1-18.

(Continued)

*Primary Examiner* — Atique Ahmed
(74) *Attorney, Agent, or Firm* — Patterson + Sheridan, LLP

(57) ABSTRACT

As reconfigurable Intelligent Surface devices (RISs) and ambient power devices become more common, it is advantageous to connect and leverage the capabilities of these devices into various wireless networks, including Wi-Fi networks. Configuring an RIS in a wireless network to provide and improve communications between an access point (AP) and an ambient power device is described. Configuring the RIS may include using a series of sounding frames between the AP and the ambient power device to update and control an RIS to improve transmission between the AP and the ambient power device.

20 Claims, 10 Drawing Sheets

(56) References Cited

U.S. PATENT DOCUMENTS

| | | | | |
|---|---|---|---|---|
| 2024/0235772 A1* | 7/2024 | Wang | ................... | H04L 5/0051 |
| 2024/0306098 A1* | 9/2024 | MolavianJazi | ..... | H04W 52/365 |
| 2025/0007564 A1* | 1/2025 | Ly | ..................... | H04B 7/04013 |

FOREIGN PATENT DOCUMENTS

| | | | | | |
|---|---|---|---|---|---|
| CN | 113795004 A | * | 12/2021 | .............. | H04W 4/02 |
| WO | 2022133952 A1 | | 6/2022 | | |
| WO | 2022151128 A1 | | 7/2022 | | |

OTHER PUBLICATIONS

Y. Liu et al., "Reconfigurable Intelligent Surfaces: Principles and Opportunities," in IEEE Communications Surveys & Tutorials, vol. 23, No. 3, pp. 1546-1577, thirdquarter 2021, doi: 10.1109/COMST.2021.3077737. [Abstract Only].

Z. Cui, "Impact of Reconfigurable Intelligent Surface Geometry on Communication Performance," arXiv.org, Dated: Nov. 3, 2022, pp. 1-5.

Q. Wu et al., "Towards Smart and Reconfigurable Environment: Intelligent Reflecting Surface Aided Wireless Network," arXiv.org, Dated: Aug. 30, 2019, pp. 1-8.

* cited by examiner

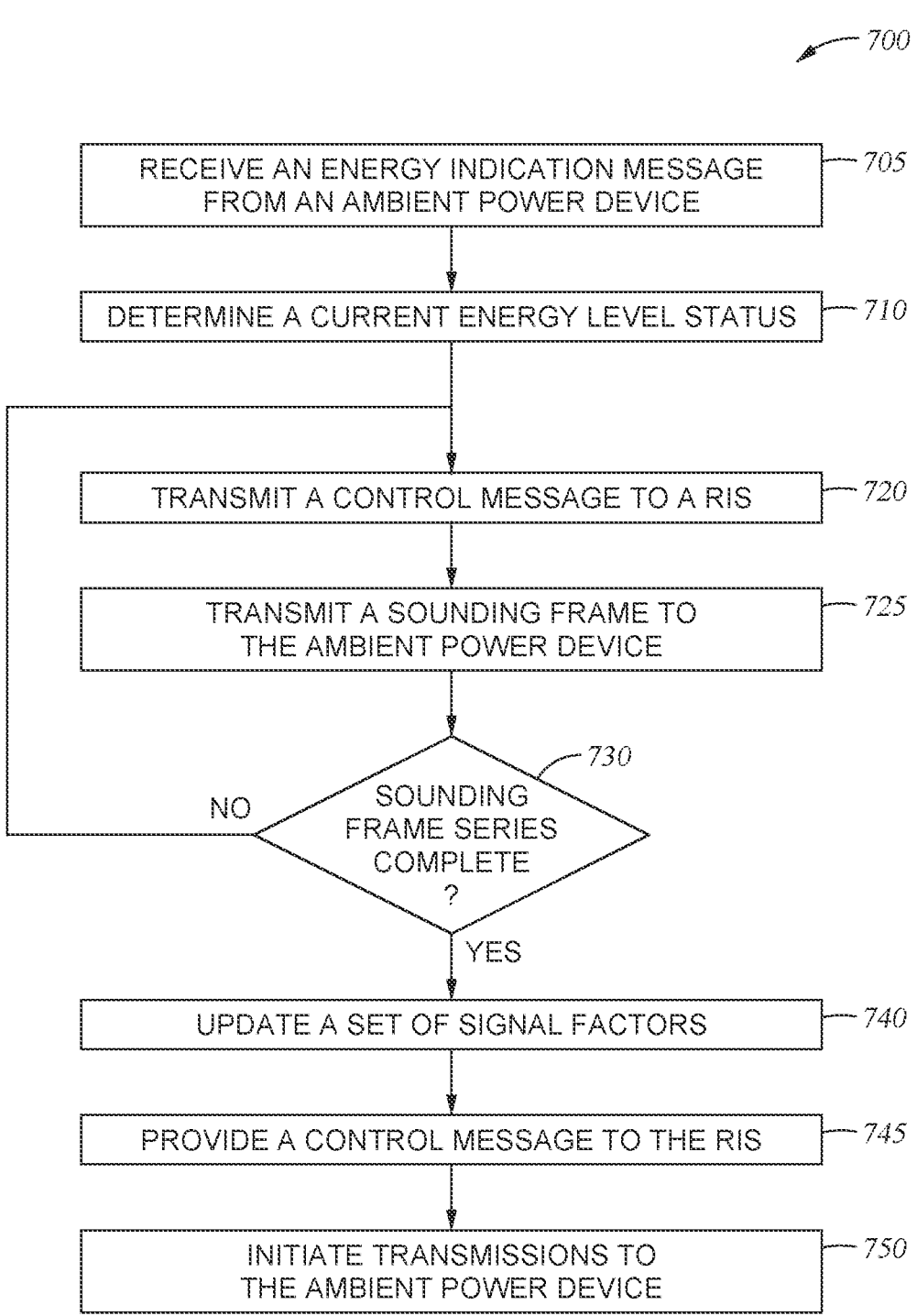

~700

RECEIVE AN ENERGY INDICATION MESSAGE FROM AN AMBIENT POWER DEVICE ~705

DETERMINE A CURRENT ENERGY LEVEL STATUS ~710

TRANSMIT A CONTROL MESSAGE TO A RIS ~720

TRANSMIT A SOUNDING FRAME TO THE AMBIENT POWER DEVICE ~725

SOUNDING FRAME SERIES COMPLETE ? ~730

NO

YES

UPDATE A SET OF SIGNAL FACTORS ~740

PROVIDE A CONTROL MESSAGE TO THE RIS ~745

INITIATE TRANSMISSIONS TO THE AMBIENT POWER DEVICE ~750

*Fig. 7*

WIRELESS COMMUNICATION WITH AMBIENT POWER DEVICES USING RECONFIGURABLE INTELLIGENT SURFACES

TECHNICAL FIELD

Embodiments presented in this disclosure generally relate to communication in a wireless network. More specifically, embodiments disclosed herein provide for wireless communication with ambient power devices using reconfigurable intelligent surfaces.

BACKGROUND

Reconfigurable Intelligent Surface devices (RISs), also known as Intelligent Reflecting Surface (IRSs) or large intelligent surfaces (LISs) devices, are increasingly used in wireless networks, including cellular networks, Wi-Fi networks, etc. An RIS typically utilizes low-cost, passive phase shifting reflecting elements that allow the RIS to reflect electromagnetic energy/waves, including radio frequency (RF) energy, through phase adjustments of the reflecting elements in order to direct the electromagnetic energy/waves in a particular direction.

Additionally, as more devices and items are connected to wireless networks in the form of internet of things (IoT) devices, wearable devices, sensors, monitors, and other devices, providing power and efficient communication to these devices is an increasing challenge. Some of these devices, such as backscatter devices (BKDs) use ambient power to harvest energy from ambient sources, including RF energy, to provide power for the various functions of the ambient power devices. For example, a sensor may harvest RF energy to perform a sensing function and to communicate in a wireless network via communication frames, etc.

While RISs have been used to improve communication with some devices in wireless communications, the limited lower power capabilities of ambient power devices present a challenge in efficiently determining an optimum configuration for an RIS to enhance communication to and from an ambient power device.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 7 is a method for providing communication in a network via an RIS, according to one embodiment.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
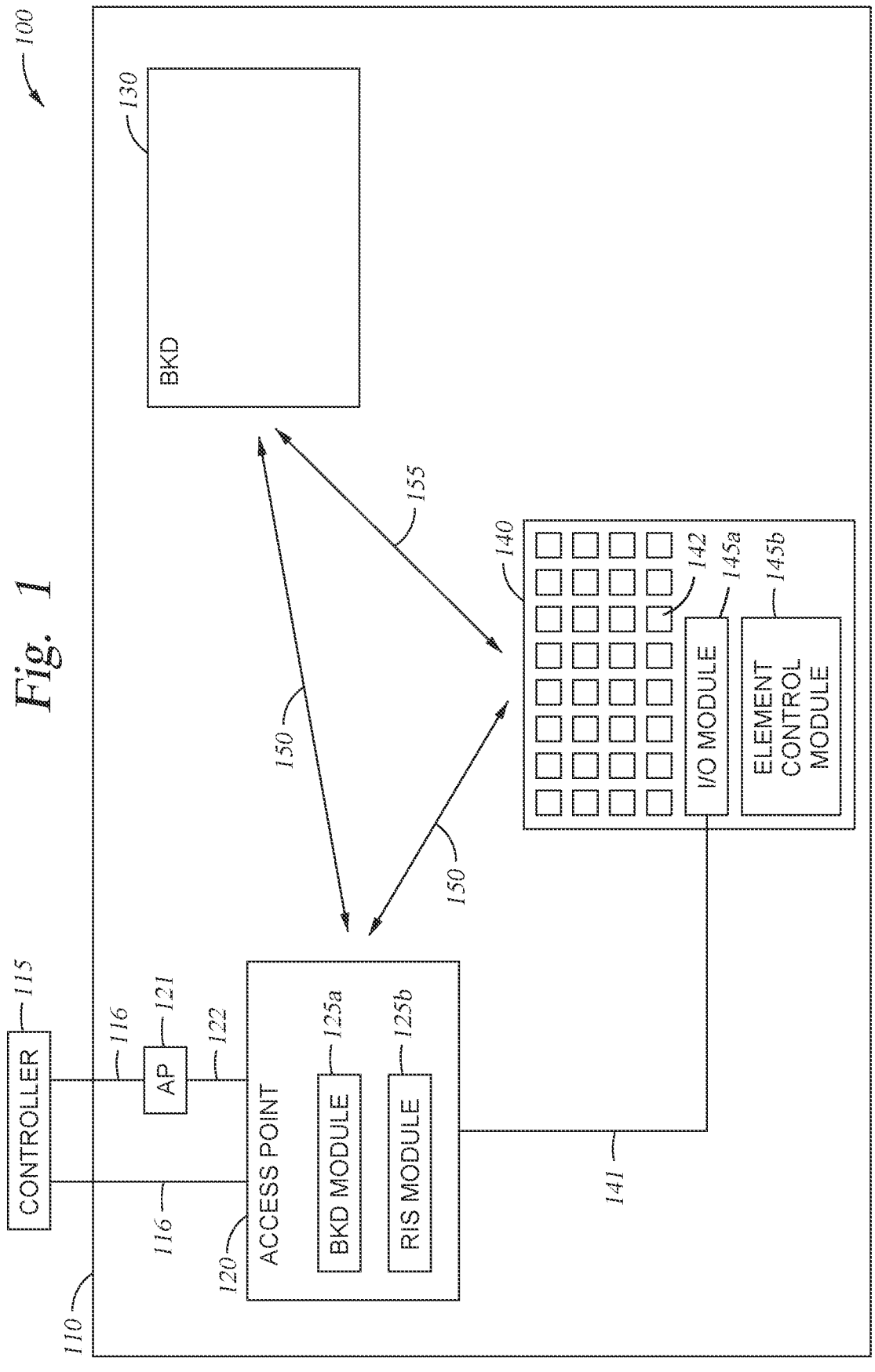
FIG. 1 is a block diagram of a network system, according to one embodiment described herein.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes receiving, at an access point (AP), an energy indication message from an ambient power device in a network, determining, from the energy indication message, a current energy level status of the ambient power device, and transmitting a series of sounding frames to the ambient power device via a reconfigurable intelligent surface device (RIS). The method also includes updating a set of signal factors based on at least one response received from the ambient power device for the series of sounding frames, providing a control message to the RIS to alter a surface of the RIS to maximize the set of signal factors and, initiating transmissions to the ambient power device based on the set of signal factors and the current energy level status. Other embodiments of this aspect include corresponding computer systems, apparatus, and computer programs recorded on one or more computer storage devices, each configured to perform the actions of the methods.

One general aspect includes an access point (AP). The AP includes a processor, and a memory which may include instructions which, when executed on the processor, performs an operation. The operation may include: receiving an energy indication message from an ambient power device in a network, determining, from the energy indication message, a current energy level status of the ambient power device, and transmitting a series of sounding frames to the ambient power device via a reconfigurable intelligent surface device (RIS). The operation may also include updating a set of signal factors based on at least one response received from the ambient power device for the series of sounding frames, providing a control message to the RIS to alter a surface of the RIS to maximize the set of signal factors, and initiating transmissions to the ambient power device based on the set of signal factors and the current energy level status. Other embodiments of this aspect include corresponding computer systems, apparatus, and computer programs recorded on one or more computer storage devices, each configured to perform the actions of the operations.

One general aspect includes a non-transitory computer-readable storage medium having program instructions embodied therewith. The program instructions are executable by a processor to perform an operation. The operation includes receiving, at an access point (AP), an energy indication message from an ambient power device in a network, determining, from the energy indication message, a current energy level status of the ambient power device, and transmitting a series of sounding frames to the ambient power device via a reconfigurable intelligent surface device (RIS). The operation also includes updating a set of signal factors based on at least one response received from the ambient power device for the series of sounding frames, providing a control message to the RIS to alter a surface of the RIS to maximize the set of signal factors, and initiating transmissions to the ambient power device based on the set of signal factors and the current energy level status. Other embodiments of this aspect include corresponding computer systems, apparatus, and computer programs recorded on one or more computer storage devices, each configured to perform the actions of the operations.

EXAMPLE EMBODIMENTS

As RISs and BKDs become more common, it is advantageous to connect and leverage the capabilities of these devices into various wireless networks, including Wi-Fi networks. In Wi-Fi 8, BKDs may be viewed as part of the 802.11 wireless local area network (WLAN). BKDs in WLANs have limited interaction with a Wi-Fi access point (AP) including communication transmissions and energy harvest, both of which can be improved, or enhanced, using RISs. The system and methods describe herein provide for configuring a RIS in a WLAN to provide and improve communications between an AP and an ambient power device such as a BKD.

FIG. 1 is a block diagram of a network system, according to one embodiment described herein. FIG. 1 is a block diagram of a system 100, according to an example embodiment. The system 100 includes a network 110 and a controller 115 for the network 110. In some examples, the network 110 is a Wi-Fi network or WLAN and includes one or more wireless access points APs, including AP 120 and AP 121. The network 110 also includes an ambient power device, such as BKD 130, and RIS 140.

While shown in FIG. 1 as including a set number of devices, the network 110 may include any number of wireless APs, RISs, ambient power devices, and other wireless client devices.

In some examples, the controller 115 interfaces with AP 120 and AP 121 via connections 116 and provides various levels of control and network access for the network 110. The AP 120 interfaces with the AP 121 via connection 122 and also interfaces with the RIS 140 via connection 141, which may include any combination of wired and/or wireless communication interfaces. The AP 120 includes BKD module 125a and RIS module 125b. The RIS module 125b facilitates the management and configurations of the RIS 140 and the BKD module 125a facilitates communication with and control of the BKD device, as discussed in further detail herein in relation to FIGS. 2-7.

During operation, the BKD 130 may perform 802.11 association and authentication procedures via AP 120 in order to wirelessly onboard/attach/connect to the network 110, which is under control and configuration of controller 115 such that the BKD 130 establishes communication sessions within system 100. Once authenticated, the BKD 130 may exchange packets with one or more networks through the AP 120 and the controller 115 during the communication sessions.

The RIS 140 is a metasurface device with an array or matrix of engineered sub-wavelength configurable reflecting elements 142 (e.g., an M×N (row×column) array or matrix or multiple arrays/matrices) which form a surface of the RIS. The configurable reflecting elements 142 may include microstrip patches, whose reflective properties can be programmatically controlled using a tunable chip in the configurable reflecting elements 142 by changing the load impedance. In some examples, the RIS 140 includes element control module 145b and one or more communication input/output (I/O) interfaces 145a. The configurable reflecting elements of an RIS may be configured in any manner in accordance with embodiments herein, which may or may not be inclusive of any number of M×N array(s), array configurations having different numbers of rows/columns, non-M×N array configurations, etc.

The element control module 145b controls the matrix or array of configurable reflecting elements 142 according to set configurations and control messages received from the AP 120, etc. In some examples, the configurable reflecting elements 142 are passive elements, where the elements reflect (without receiving and demodulating/processing) electromagnetic energy/waves by adjusting a phase of the configurable reflecting elements 142 to direct the electromagnetic energy/waves in a particular direction, such as towards the BKD 130. For example, the AP 120 transmits RF signal 150 towards the BKD 130 and a portion 155 of the RF signal 150 reflects off the configurable reflecting elements 142, also towards the BKD 130.

In some examples, configurable reflecting elements of RISs can be configured statically to provide a single reflection angle or can be configured using a pre-determined sequence in time and/or space domains to provide fast sweeps through different reflection angles (e.g., for jamming purposes, etc.). In the time domain, all the configurable reflecting elements can cause the same reflection angle for an AP signal and can all be changed together to provide a new angle. In the space domain, a first (ith) reconfigurable reflecting element, which may be denoted (Mi,Ni), may not have the same angle effect as a second (jth) reconfigurable element (Mj,Nj), thus at a given point in time a AP signal, such as the RF signal 150 can be reflected differently on individual elements of the array, thereby reflecting the AP signal in different directions. In accordance with embodiments herein, coordinated steering techniques are provided in order to allow AP 120, via element control module 145b, to leverage the RIS 140 in order to optimize transmissions to and from the BKD 130 as described in more detail in relation to FIGS. 2-7 described herein.

Figure 2:
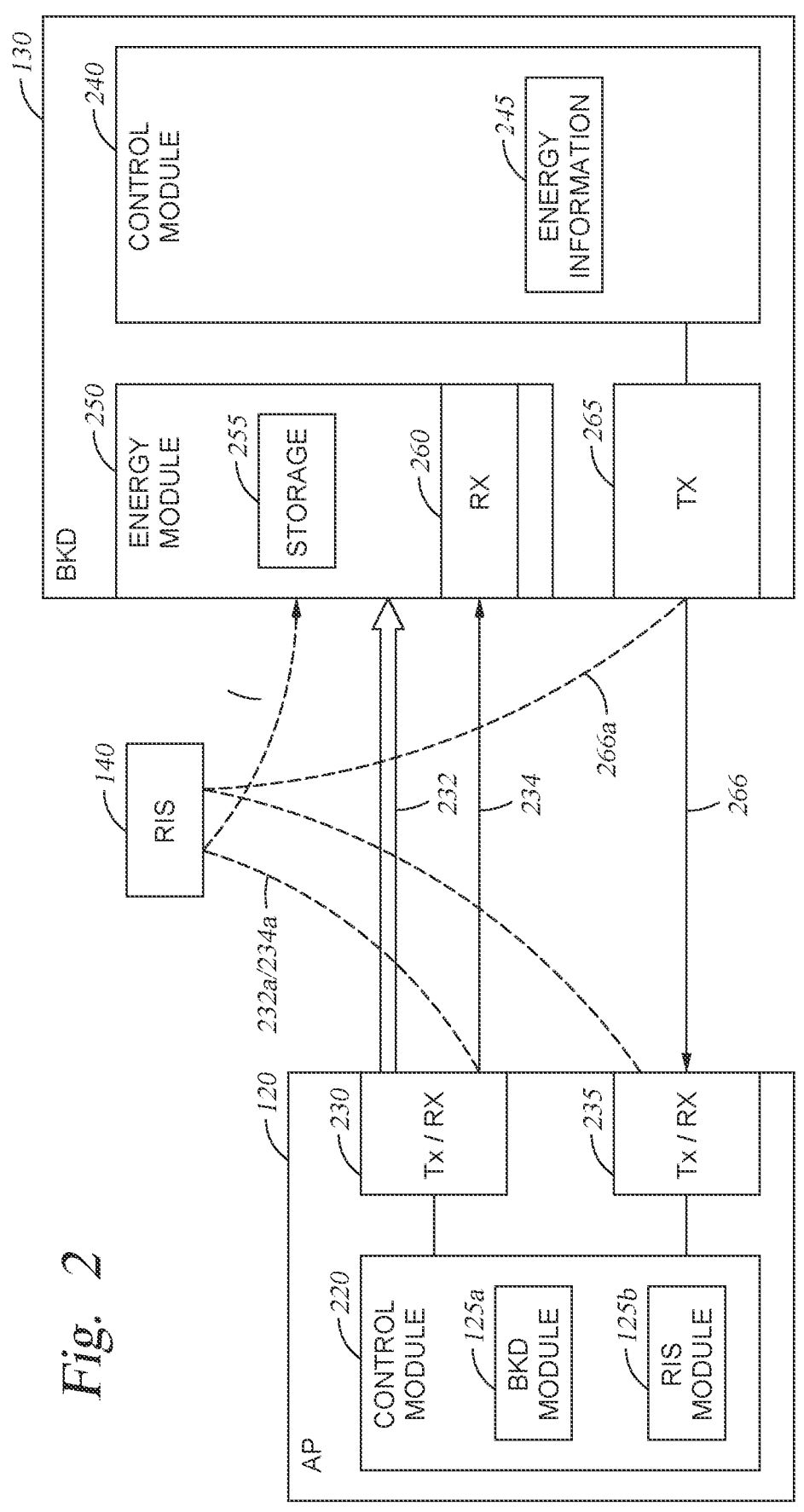
FIG. 2 illustrates interactions between an AP, an RIS, and a BKD, according to one embodiment described herein.

FIG. 2 illustrates interactions between the AP 120, the RIS 140, and the BKD 130, according to one embodiment described herein. The AP also includes control module 220, a transceiver or radio such as (Tx/Rx) 230 and Tx/Rx 235. The BKD 130 includes receiver (Rx) 260 and transmitter (Tx) 265 where the AP 120 sends transmission signals (Tx signals) 234 to the BKD 130 and receives Rx signals 266 from the BKD 130. In some examples, the various transmitters and receivers in the AP and BKD are collocated as transceivers.

The BKD 130 also includes energy module 250 and storage 255 which harvests energy, such as RF beam 232 transmitted from the AP 120, to provide power for the various functions performed by the BKD 130. In some examples, the energy module 250 stores harvested energy in capacitors or other storage components in the storage 255 in order to build up energy for various energy intensive processes/functions performed by the BKD 130.

The BKD 130 includes control module 240 which includes energy information 245. In some examples, the control module 240, in conjunction with the AP 120, performs an onboarding or other similar process to connect the BKD 130 to the network 110. In some examples, the BKD 130 may perform passive functions, where the Tx signals

234 provide sufficient ambient power for the BKD 130 to send Rx signals 266 (e.g., the passively BKD 130 reflects signals back to the AP 120). In some examples, some functions and processes of the BKD require more power than can be provided in a single set of Tx signals from the AP 120. In this example, the BKD 130 generates and provides energy information 245 to the AP 120 in order to receive sufficient energy to perform a process.

In some examples, communication between the AP 120 and the BKD 130 may be improved or enhanced by the RIS 140. For example, the RIS 140 reflects Tx signals 234 and RF beam 232 to the BKD 130 as reflected signals 232a/234a. The RIS 140 may also reflect the Rx signals 266 as reflected signals 266a to the AP 120. As described above, the configurability of the RIS 140 allows for optimization of the manner the various reflected signals are received at the AP 120 and BKD 130 as described in relation to FIGS. 3, 4A-4B, and 5A-5B.

Figure 3:
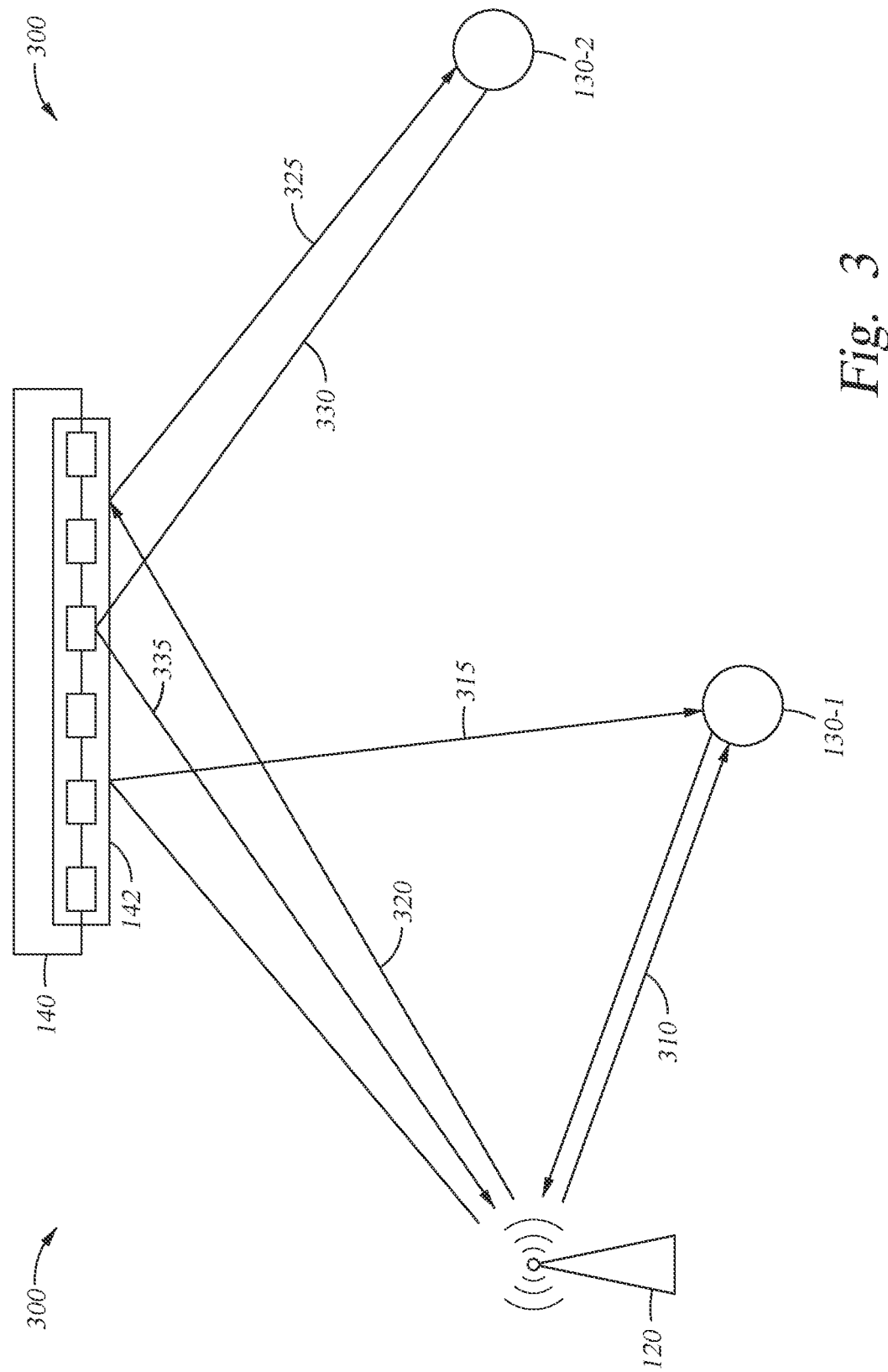
FIG. 3 illustrates an arrangement of an AP, RIS, and BKDs in a network, according to one embodiment.

FIG. 3 illustrates an arrangement 300 of an AP, RIS, and BKDs in a network, according to one embodiment. The arrangement 300 includes the AP 120, the RIS 140, BKD 130-1, and BKD 130-2. As described above, the RIS 140 can improve or enhance communications between the AP 120 and the BKDs as well as improve energy harvest capabilities for the BKDs in the network 110.

For example, the BKD 130-1 may be located in a vicinity of AP 120 where direct communication with the AP 120 is possible via connection 310. In this case, the RIS 140 may improve communication between the AP 120 and the BKD 130-1 where reflected signals improve the reliability of the signals sent via the connection 310. In another example, the RIS may also improve energy harvesting at the BKD 130-1, where the connection 310 may include RF beams sent to the BKD 130-1 from the AP 120 and the reflected signals 315 also include reflected beams generated by the AP 120.

In some examples, the reflected signals of the RIS 140 may serve as a sole communication mechanism between the AP 120 and a BKD. For example, the BKD 130-2 may be outside of a signal range of the AP 120 or there may be some sort of obstruction or barrier between the AP 120 and the BKD 130-2 such that direct communication between the BKD 130-2 and the AP 120 is difficult. In this case, the RIS 140 provides a connection between the BKD 130-2 and the AP 120. For example, the RIS 140 reflects signals 320 from the AP 120 as signals 325 towards the BKD 130-2 and reflects signals 330 from the BKD 130-2 as signals 335 towards the AP 120.

As demonstrated in FIG. 3, the BKDs in the network 110 may be at different locations relative to the AP 120. An optimum configuration of the configurable reflecting elements 142 of the RIS 140 for the signals 315 will likely not be the same configuration to optimize reflection of the signals 325 and 335. In order to provide the best configuration for various BKDs in the network 110, the AP 120, in conjunction with the RIS 140 and the BKDs, performs the methods described in more detail in relation to FIGS. 4A-4B, 5A-5B, 6, and 7.

Figure 4A:
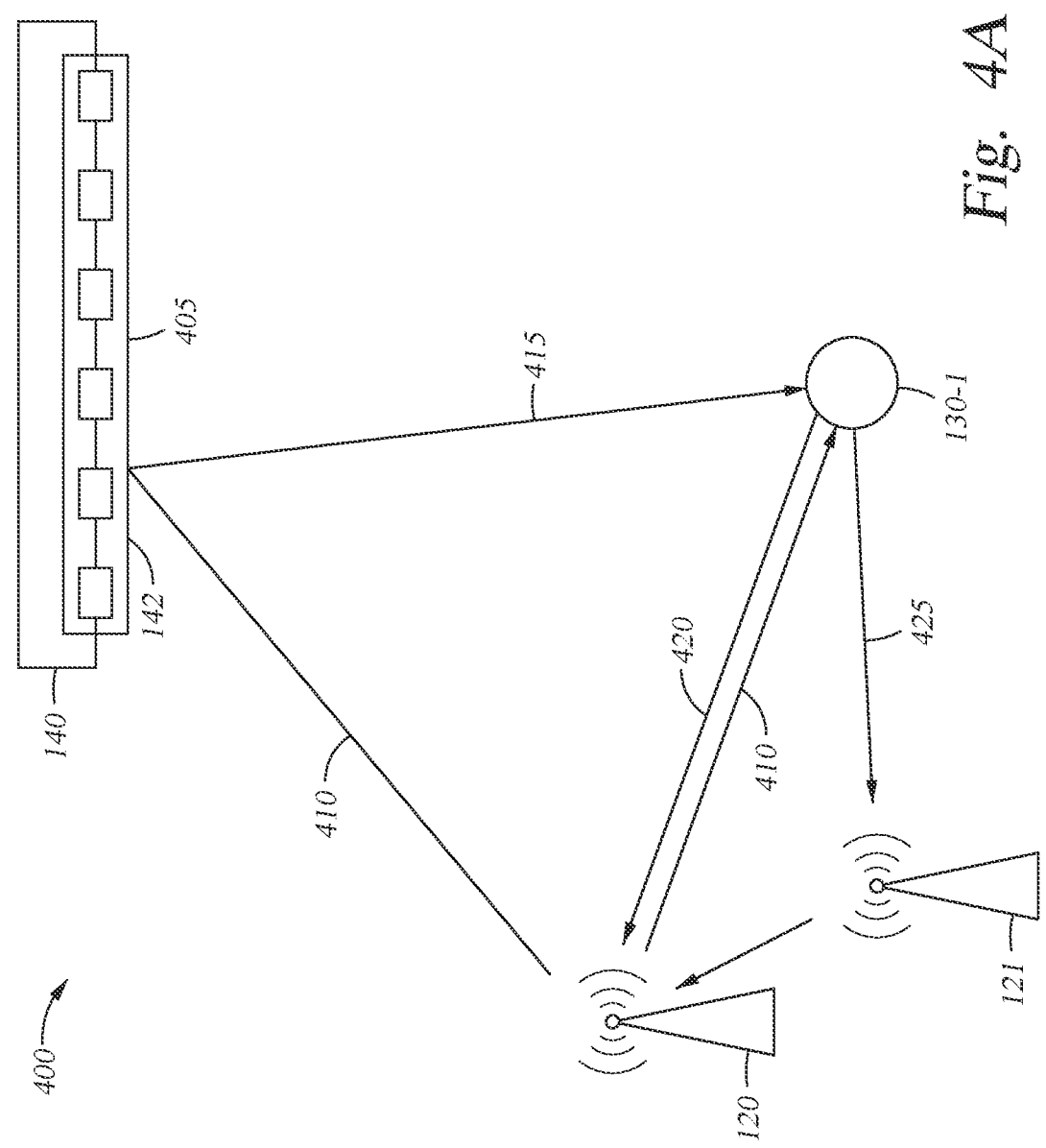
FIGS. 4A-4B illustrate example configurations of an RIS, according to one embodiment.
Figure 4B:
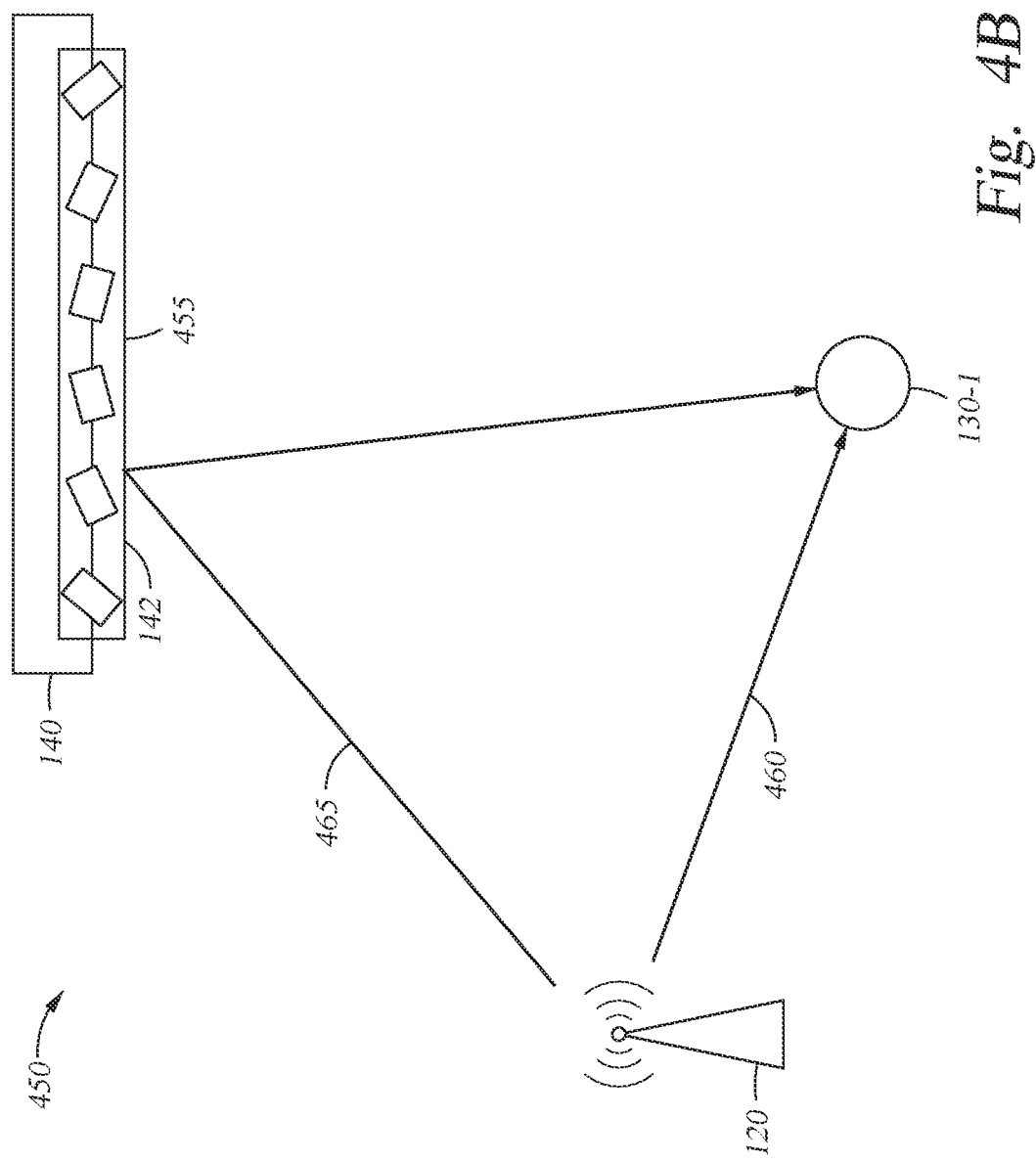

FIGS. 4A-4B illustrate example configurations of an RIS, according to one embodiment. In arrangement 400 of FIG. 4A, the RIS 140 and the elements are in a configuration 405. In this example, the configurable reflecting elements 142 may be in a configuration provided by the AP 120 during a sounding phase described herein. In this example, the AP 120 transmits signals 410 (e.g., sounding frames) to the BKD 130-1. Some portion (including all) of the signals 410 reflect as signals 415 to the BKD 130-1. The BKD 130-1 transmits signals 420 to the AP 120. In some examples, the signals 420 are passive signals reflected back to the AP 120 such as a modulated frame (p-BKD) where the AP 120 measures various parameters of the signals 420 to determine a strength of the signals 415 in in the configuration 405.

In some examples, the AP 120 may transmit the signals 410 via one radio on the AP and receive the signals 420 via a second radio on the AP 120. In another example, a second AP, such as the AP 121 may receive the signals 420 as signals 425 and communicate received information to the AP 120 for processing. In another example, the signals 420 may include a feedback matrix generated by the BKD, which includes information for the AP 120 to determine the strength and other properties of the signal 415 (and other signals) in the configuration 405. In some examples, the BKD transmits the feedback matrix upon harvesting sufficient energy to emit a sounding frame response to the AP.

In arrangement 450 of FIG. 4B, the RIS 140 and the elements are in a configuration 455. In some examples, the configuration 455 may improve various communication between the AP 120 and the BKD 130-1 as determined during a sounding frame process described herein. The configuration 455 may also include an optimum configuration for providing ambient power to the BKD 130-1. For example, the RIS 140 may rotate one or more edge elements of the configurable reflecting elements 142 to form a virtual parabolic reflector and focus RF energy toward the ambient power device for energy harvesting. For example, the AP 120 may transmit RF beam 460 to the BKD 130-1. In some examples, the RIS 140 reflects the RF beam 460 back to the BKD 130-1 as RF beam 465. In another example, the RF beam 465 may be RF beam transmitted by the AP 120 (or another AP such as AP 121) towards the RIS 140 in order to utilize the parabolic reflector for reflection towards the BKD 130-1.

Figure 5A:
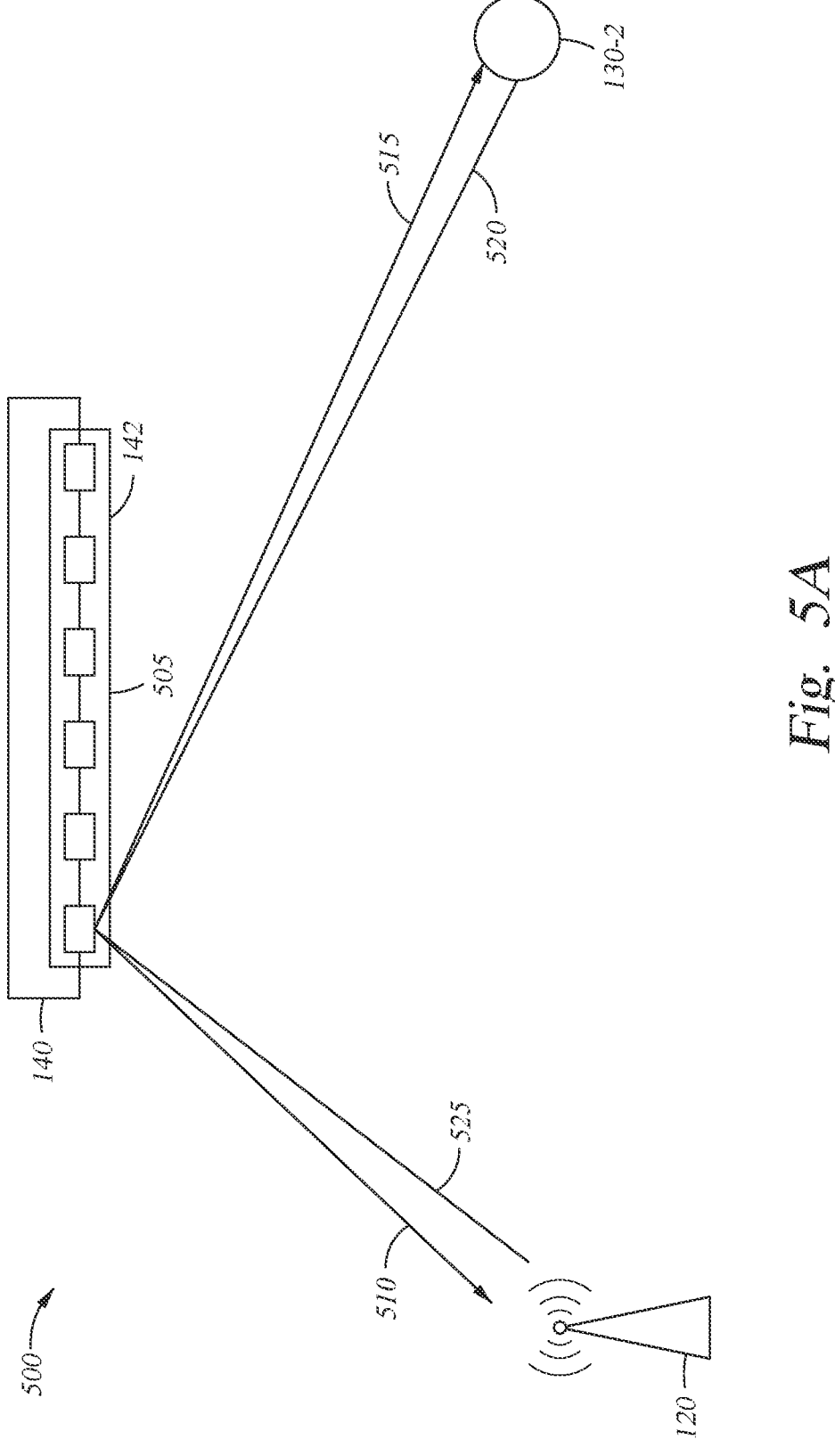
FIGS. 5A-5B illustrate example configurations of an RIS, according to one embodiment.
Figure 5B:
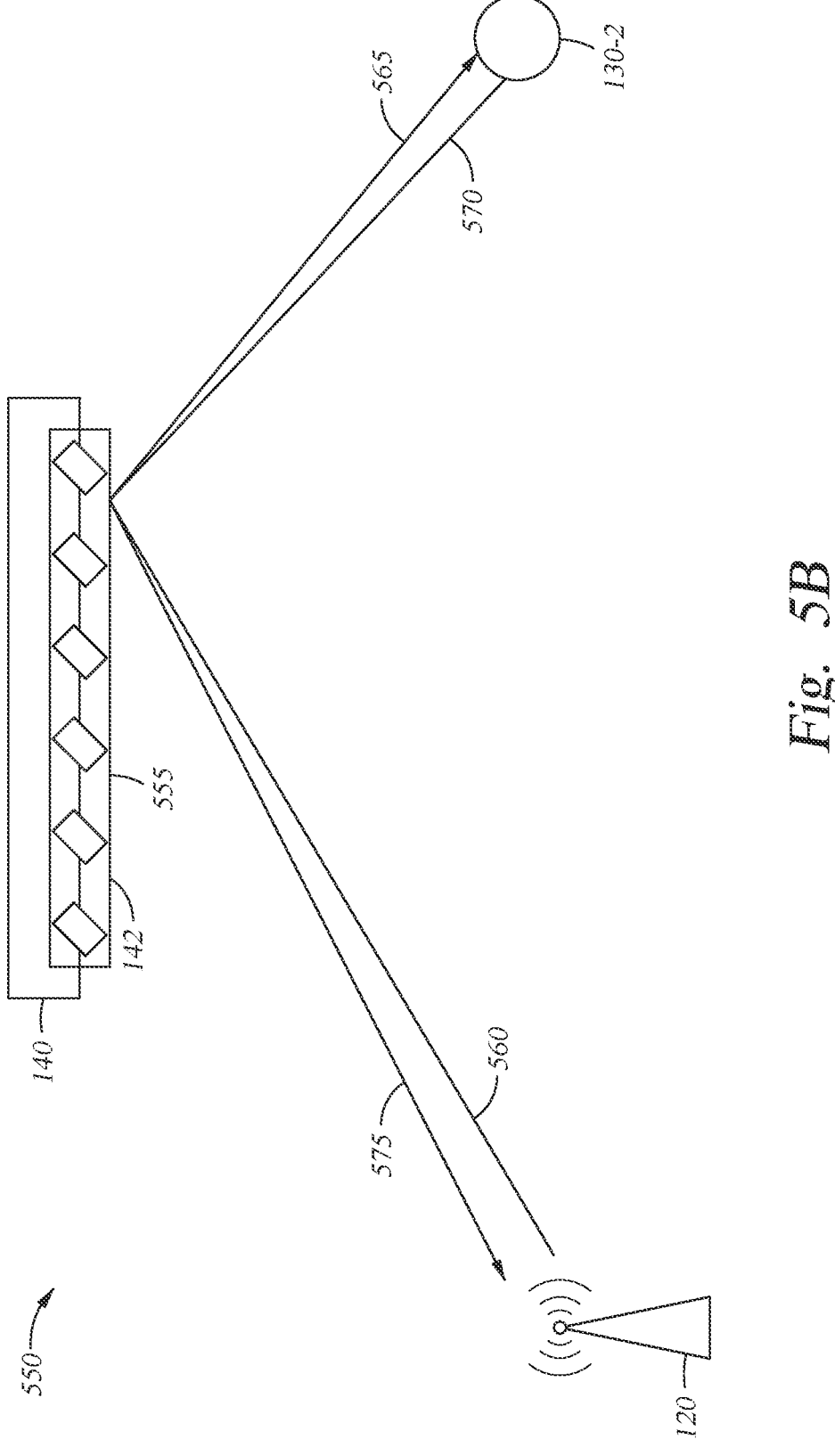

FIGS. 5A-5B illustrate example configurations of an RIS, according to one embodiment. In arrangement 500 of FIG. 5A, the RIS 140 and the elements are in a configuration 505. In this example, the configurable reflecting elements 142 may be in a configuration provided by the AP 120 during a sounding phase described herein. In this example, the AP 120 transmits signals 510 (e.g., sounding frames) to the BKD 130-2. Some portion of the signals 510 (e.g., including a subset or an entirety of signals) reflect as signals 515 to the BKD 130-2. The BKD 130-2 transmits signals 520 to the AP 120 which reflect as signals 525. In some examples, the signals 520 are passive signals reflected back to the AP 120 such as a p-BKD where the AP 120 measures various parameters of the signals 520 to determine a strength of the signals 515 in in the configuration 505.

In some examples, the AP 120 may transmit the signals 510 via one radio on the AP and receive the signals 420 via a second radio on the AP 120 (e.g., via the Tx/Rx 230 and Tx/Rx 235 shown in FIG. 2) or a via a second AP, such as the AP 121, as described in FIG. 4A. In another example, the signals 520 may include a feedback matrix generated by the BKD 130-2, which includes information for the AP 120 to determine the strength and other properties of the signal 515 (and other signals) in the configuration 505.

In arrangement 550 of FIG. 5B, the RIS 140 and the elements are in a configuration 555. The configuration 555 may also include an optimum configuration for providing ambient power to the BKD 130-2 via RF beams (as described in relation to FIG. 4B above). In another example, the configuration 555 provides an improved communication path between the AP 120 and the BKD 130-2 as determined during a sounding frame process described herein. For example, the RIS 140 may rotate one or more edge elements of the configurable reflecting elements 142 to provide for efficient reflection of signals 560 and 570 as signals 565 and 575 between the AP 120 and the BKD 130-2. Determining and providing the optimum configuration shown in FIGS. 4B and 5B are described in more detail in relation to the system flow and methods of FIGS. 6 and 7.

Figure 6:
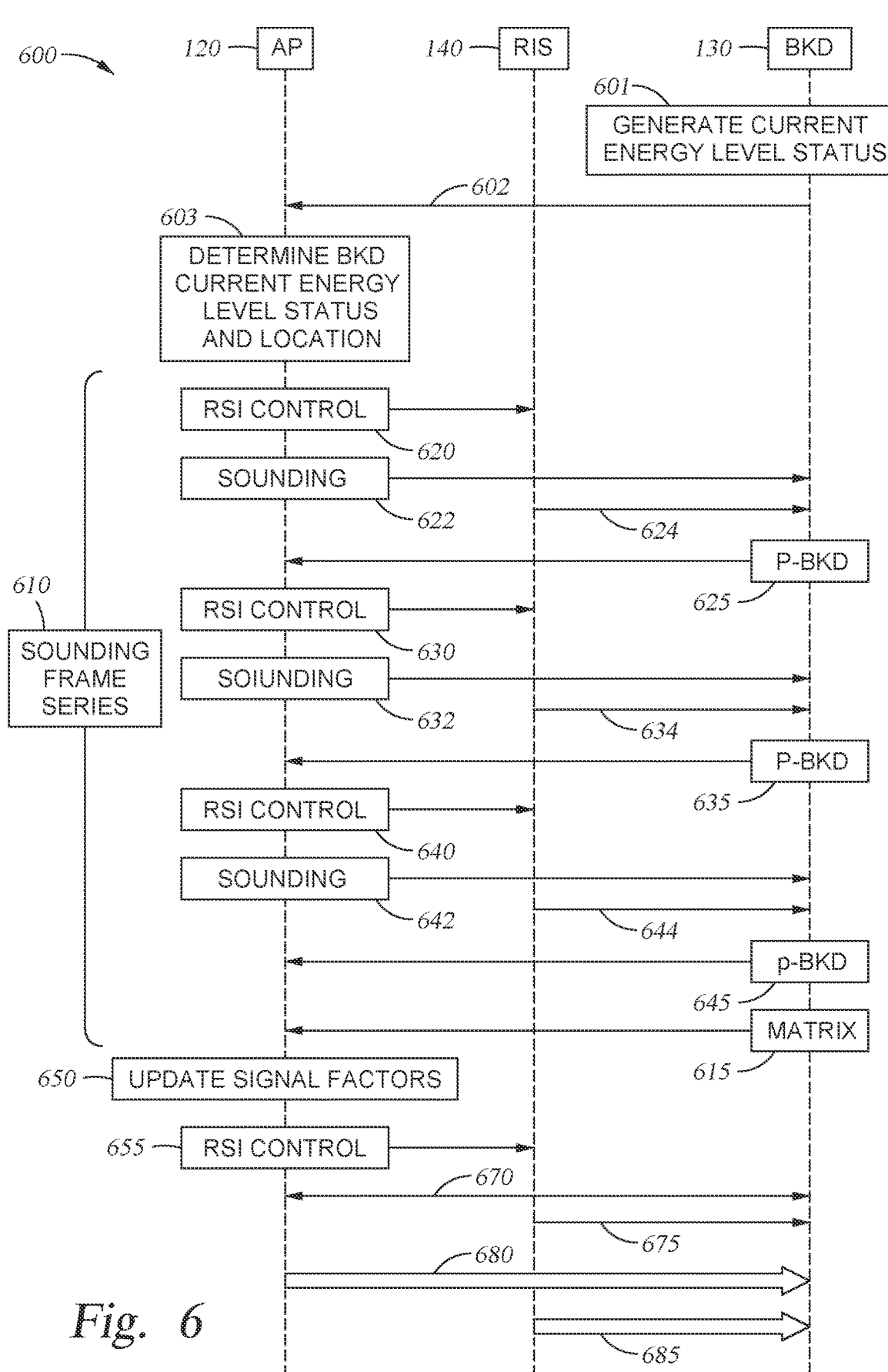
FIG. 6 illustrates a system flow diagram, according to one embodiment.

FIG. 6 illustrates a system flow diagram and FIG. 7 is a method 700 for providing communication in the network 110 via the RIS 140, according to one embodiment. For ease of illustration and discussion, the method 700 will be discussed in parallel with system flow 600 in FIG. 6. Referring to FIG. 7, method 700 begins at block 705 where the AP 120 receives an energy indication message from an ambient power device in a network and determines, from the energy indication message, a current energy level status at block 710. For example, as shown at steps 601 and 602 in system flow 600, the BKD 130 generates a current energy level status at step 601, which may include any combination of energy requirements for functions performed by the BKD, energy storage capabilities, a current stored energy level, as well as communication levels, etc.

At step 602, the AP 120 receives the current energy level status and, at step 603, determines the current energy level status for the BKD 130. In some examples, the AP 120 determines from the current energy level status various information including one or more of a needed energy from the BKD 130 and communication parameters for the BKD 130. In some examples, the AP 120 also determines a location of the BKD 130 relative to the AP 120 based on received signals from the BKD 130 and other location information such as information received from the controller 115, etc.

In an example where the BKD 130 is in a new location or communication between the AP 120 and the BKD 130 has changed since a last communication (e.g., an obstruction has moved between the AP 120 and the BKD 130), the AP 120 proceeds to blocks 720-730 of method 700 and step 610 of system flow 600. For example, the AP 120 begins a sounding frame series process at step 610 in order to determine an optimum configuration for the RIS 140 to improve or enhance signal transmissions between the AP 120 and the BKD 130. At block 720, the AP 120 transmits a control message to adjust elements of the RIS 140 for a first sounding frame and transmits a sounding frame to the BKD at block 725, and continues this process at block 730 until the sounding frame series is complete.

Referring to steps 610 in the system flow 600, the AP 120 determines and transmits a RSI control message at step 620 to alter the configurable reflecting elements 142 to a new configuration. In some examples, the control message at step 620 includes a standard configuration for sounding frames (e.g., a standard initial configuration) or is a configuration determined based on a location of the BKD. For example, the control message at step 620 may include different initial configurations depending on whether the sounding series is for the BKD 130-1 or BKD 130-2 based on their respective locations as shown in FIG. 3.

At step 622, the AP 120 transmits a sounding frame which may reflect off of the RIS 140 at step 624. For example, the BKD 130 passively emits a p-BKD back to the AP 120 at step 625. In another example, AP 120 may continue transmitting the sounding frames to the BKD 130 until the BKD 130 harvests enough energy to generate a frame matrix which is transmitted to the AP 120 at step 615.

In some examples, the AP 120 proceeds through several iterations of updating RSI controls, emitting sounding frames, and receiving p-BKDs/frame matrix signals as shown in steps 630, 632, 634, 635, 640, 642, 644, and 645. In the steps 620 and 640, the RIS configurations may be determined based on pre-set configurations or may be based on feedback received from the BKD 130 (e.g., based on the p-BKDs and frame matrices received from the BKD 130).

In some examples, at block 730 the AP 120 determines based on the received frame matrix or other factors (e.g., a timeout mechanism, etc.) that the sound frames series is complete. At block 740, the AP 120 updates a set of signal factors based on at least one response received from the ambient power device for the series of sounding frames. For example, at step 650, the AP 120 updates signal factors for communications between the AP 120 and the BKD 130 based on any or all of the p-BKD or frame matrices received in the sounding frame series. The signal factors may include various information related to an RIS configuration which provided the best reception of signals between the AP 120 and BKD 130 based on the type of transmission (e.g., beacons, periodic sounding frames, RF beams, etc.).

At block 745, the AP 120 provides a control message to the RIS to alter a surface of the RIS to maximize the set of signal factors and initiates transmissions to the BKD 130 based on the set of signal factors and the current energy level status at block 750. For example, at step 655, the AP 120 generates and transmits the control message to the RIS 140, which alters the configurable reflecting elements 142 based on the BKD 130 and the type of communication. In some examples, the configuration of the configurable reflecting elements 142 determined by the AP 120 may be a first configuration for the standard communication transmission shown at steps 670 and 675 and a second configuration for RF beams shown at steps 680 and 685. The AP 120 then transmits RF energy to the ambient power device for communication and/or to meet an energy requirement indicated in the current energy level status at the steps 670 and 680. The AP 120 may also utilize the updated signal factors to generate control messages for the RIS 140 while the BKD 130 is in a same location as determined at step 603. In an example, where the BKD 130 is in a different location, the AP 120 repeats the sounding frame series at step 610 to update the signal factors.

Figure 8:
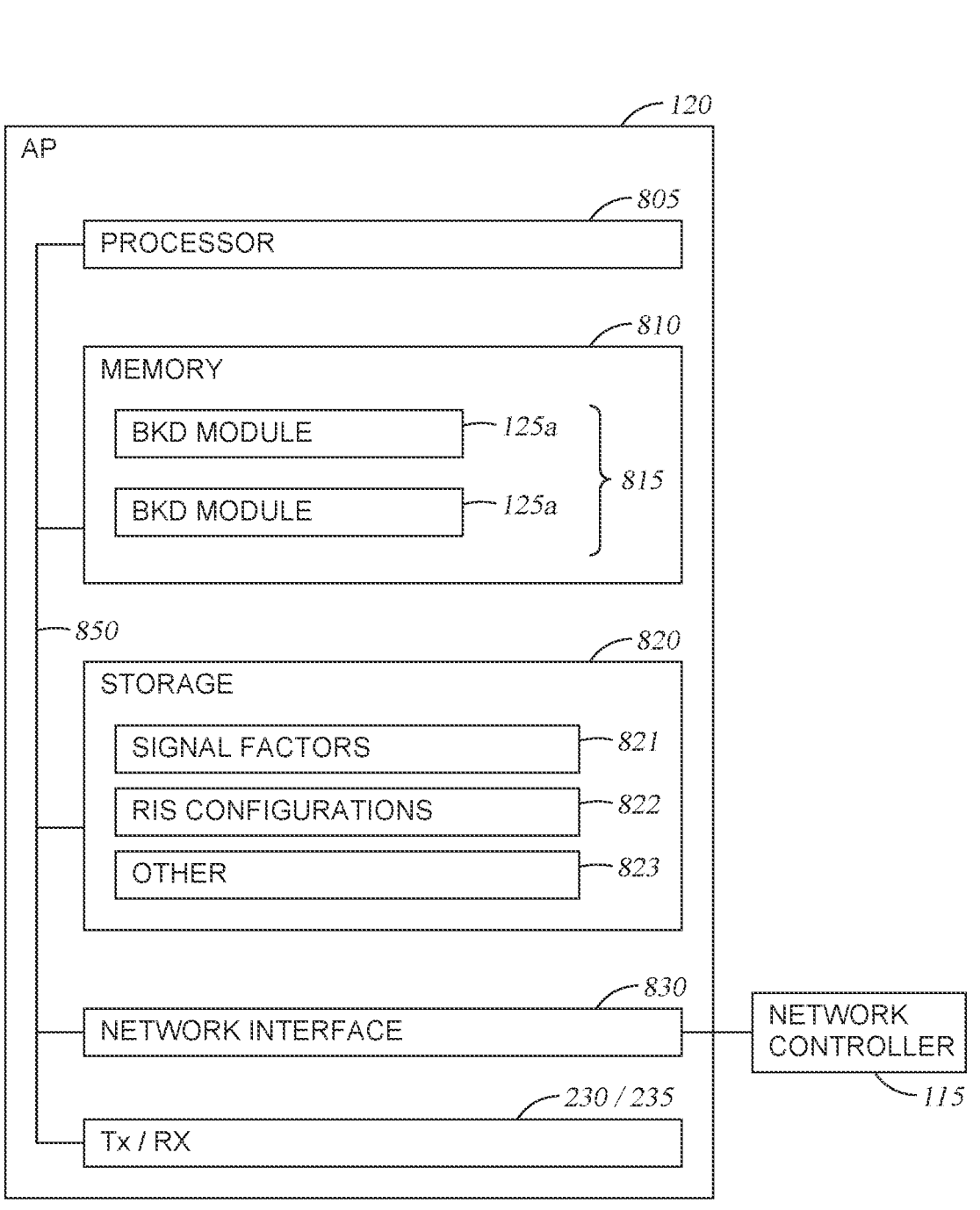
FIG. 8 is a block diagram of an Access Point, according to one embodiment.

FIG. 8 is a block diagram of an AP 120, according to one embodiment. Arrangement 800 may include AP 120 configured to execute the various functions of the controllers described herein. The AP 120 is shown in the form of a general-purpose computing device, but may include a server and/or application executing on a cloud network. The components of AP 120 may include, but are not limited to, one or more processing units or processors 805, a system memory 810, a storage system 820, network interface 830 connecting the AP 120 to network controller 115 and external networks, Tx/Rx 230 and 235, and a bus 850 that couples various system components including the system memory 810 and storage system 820 to processors 805 along with various input/output components (not shown). In other embodiments, arrangement 800 is distributed and includes a plurality of discrete computing devices that are connected through wired or wireless networking.

Bus 850 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

AP 120 typically includes a variety of computer system readable media (e.g., a non-transitory computer-readable storage medium). Such media may be any available media that is accessible by AP 120, and it includes both volatile and non-volatile media, removable and non-removable media.

System memory 810 can include computer system readable media in the form of volatile memory, such as random access memory (RAM) and/or cache memory. AP 120 may further include other removable/non-removable, volatile/non-volatile computer system storage media. By way of example, storage system 820 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 850 by one or more data media interfaces. As will be further depicted and described below, system memory 810 may include at least one program product having a set (e.g., at least one) of program modules that are configured to carry out the functions of various embodiments described herein.

AP 120 may further include other removable/non-removable, volatile/non-volatile computer system storage media. In some examples, storage system 820 may be included as part of system memory 810 and may typically provide a non-volatile memory for the networked computing devices, and may include one or more different storage elements such as Flash memory, a hard disk drive, a solid state drive, an optical storage device, and/or a magnetic storage device. For example, storage system 820 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 850 by one or more data media interfaces. Storage system 820 may include media for a Signal Factors 821, RIS configurations 822, and other information 823 stored for access and use by the AP 120.

System memory 810 may include a plurality of modules 815 for performing various functions described herein. The modules 815 generally include program code that is executable by one or more of the processors 805. As shown, modules 815 include the BKD module 125*a* and RIS module 125*b*. The modules 815 may also interact with each other and storage system 820 to perform certain functions as described herein.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   receiving, at an access point (AP), an energy indication message from an ambient power device in a network;
   determining, from the energy indication message, a current energy level status of the ambient power device;
   transmitting a series of sounding frames to the ambient power device via a reconfigurable intelligent surface device (RIS);
   updating a set of signal factors based on at least one response received from the ambient power device for the series of sounding frames;
   providing a control message to the RIS to alter a surface of the RIS to maximize the set of signal factors; and
   initiating transmissions to the ambient power device based on the set of signal factors and the current energy level status.

2. The method of claim 1, wherein the ambient power device comprises a backscatter device (BKD).

3. The method of claim 2, wherein the at least one response comprises a modulated frame (p-BKD) passively reflected back from the BKD.

4. The method of claim 1, wherein the at least one response comprises a feedback matrix generated by the ambient power device upon harvesting sufficient energy to emit a sounding frame response to the AP.

5. The method of claim 1, wherein transmitting the series of sounding frames further comprises:

transmitting a series of control messages to adjust elements of the RIS for each sound frame in the series of sounding frames.

6. The method of claim 1, wherein the control message causes the RIS to rotate one or more edge elements on the surface to form a virtual parabolic reflector and focus RF energy toward the ambient power device for energy harvesting and wherein initiating transmissions to the ambient power device comprises:
   transmitting RF energy to the ambient power device to meet an energy requirement indicated in the current energy level status.

7. The method of claim 1, wherein the control message causes the RIS to rotate one or more elements on the surface to provide an angle for communication with the ambient power device.

8. An access point (AP), comprising:
   a processor; and
   a memory comprising instructions which, when executed on the processor, performs an operation, the operation comprising:
      receiving an energy indication message from an ambient power device in a network;
      determining, from the energy indication message, a current energy level status of the ambient power device;
      transmitting a series of sounding frames to the ambient power device via a reconfigurable intelligent surface device (RIS);
      updating a set of signal factors based on at least one response received from the ambient power device for the series of sounding frames;
      providing a control message to the RIS to alter a surface of the RIS to maximize the set of signal factors; and
      initiating transmissions to the ambient power device based on the set of signal factors and the current energy level status.

9. The AP of claim 8, wherein the ambient power device comprises a backscatter device (BKD).

10. The AP of claim 9, wherein the at least one response comprises a modulated frame (p-BKD) passively reflected back from the BKD.

11. The AP of claim 8, wherein the at least one response comprises a feedback matrix generated by the ambient power device upon harvesting sufficient energy to emit a sounding frame response to the AP.

12. The AP of claim 8, wherein transmitting the series of sounding frames further comprises:
   transmitting a series of control messages to adjust elements of the RIS for each sound frame in the series of sounding frames.

13. The AP of claim 8, wherein the control message causes the RIS to rotate one or more edge elements on the surface to form a virtual parabolic reflector and focus RF energy toward the ambient power device for energy harvesting and wherein initiating transmissions to the ambient power device comprises:
   transmitting RF energy to the ambient power device to meet an energy requirement indicated in the current energy level status.

14. The AP of claim 8, wherein the control message causes the RIS to rotate one or more elements on the surface to provide an angle for communication with the ambient power device.

15. A non-transitory computer-readable storage medium having program instructions embodied therewith, the program instructions executable by a processor to perform an operation comprising:

receiving, at an access point (AP), an energy indication message from an ambient power device in a network;

determining, from the energy indication message, a current energy level status of the ambient power device;

transmitting a series of sounding frames to the ambient power device via a reconfigurable intelligent surface device (RIS);

updating a set of signal factors based on at least one response received from the ambient power device for the series of sounding frames;

providing a control message to the RIS to alter a surface of the RIS to maximize the set of signal factors; and initiating transmissions to the ambient power device based on the set of signal factors and the current energy level status.

16. The computer-readable storage medium of claim 15, wherein the ambient power device comprises a backscatter device (BKD), and wherein the at least one response comprises a modulated frame (p-BKD) passively reflected back from the BKD.

17. The computer-readable storage medium of claim 15, wherein the at least one response comprises a feedback matrix generated by the ambient power device upon harvesting sufficient energy to emit a sounding frame response to the AP.

18. The computer-readable storage medium of claim 15, wherein transmitting the series of sounding frames further comprises:

transmitting a series of control messages to adjust elements of the RIS for each sound frame in the series of sounding frames.

19. The computer-readable storage medium of claim 15, wherein the control message causes the RIS to rotate one or more edge elements on the surface to form a virtual parabolic reflector and focus RF energy toward the ambient power device for energy harvesting and wherein initiating transmissions to the ambient power device comprises:

transmitting RF energy to the ambient power device to meet an energy requirement indicated in the current energy level status.

20. The computer-readable storage medium of claim 15, wherein the control message causes the RIS to rotate one or more elements on the surface to provide an angle for communication with the ambient power device.

* * * * *